United States Patent
Akiva et al.

(10) Patent No.: US 11,959,771 B2
(45) Date of Patent: Apr. 16, 2024

(54) CREATION AND USE OF ENHANCED MAPS

(71) Applicant: RED BEND LTD., Hod Hasharon (IL)

(72) Inventors: Ohad Akiva, Ramat-Gan (IL); Dan Atsmon, Rehovot (IL)

(73) Assignee: RED BEND LTD., Hod Hasharon (IL)

( * ) Notice: Subject to any disclaimer, the term of this patent is extended or adjusted under 35 U.S.C. 154(b) by 136 days.

(21) Appl. No.: 17/219,810

(22) Filed: Mar. 31, 2021

(65) Prior Publication Data

US 2021/0247193 A1 Aug. 12, 2021

Related U.S. Application Data

(62) Division of application No. 15/860,628, filed on Jan. 2, 2018, now Pat. No. 10,969,229.

(30) Foreign Application Priority Data

Jan. 3, 2017 (EP) ..................................... 17150155

(51) Int. Cl.
*G01C 21/00* (2006.01)
*G01C 21/12* (2006.01)
(Continued)

(52) U.S. Cl.
CPC ....... *G01C 21/3848* (2020.08); *G01C 21/005* (2013.01); *G01C 21/12* (2013.01);
(Continued)

(58) Field of Classification Search
CPC ...... G01C 21/32; G01C 21/005; G01C 21/12; G01C 21/28; G01S 19/485; G06T 7/62;
(Continued)

(56) References Cited

U.S. PATENT DOCUMENTS 8,605,947 B2 * 12/2013 Zhang .................... G08G 1/167
348/148
8,890,896 B1 * 11/2014 Tseng ................... G05D 1/0274
340/8.1
(Continued)

FOREIGN PATENT DOCUMENTS

AT 511460 A4 12/2012
EP 1 860 456 A1 11/2007
(Continued)

OTHER PUBLICATIONS

JP 2020516853 A translation (Year: 2020).*
(Continued)

*Primary Examiner* — Frederick M Brushaber
(74) *Attorney, Agent, or Firm* — Artegis Law Group, LLP

(57) ABSTRACT

A method of enhancing positioning of a moving vehicle based on visual identification of visual objects, comprising obtaining from a location sensor a global positioning and a movement vector of a moving vehicle, capturing one or more images using one or more imaging devices mounted on the moving vehicle to depict at least partial view of a surroundings of the moving vehicle, analyzing the image(s) to identify one or more visual objects having a known geographical position obtained according to the global positioning from a visual data record associated with a navigation map, analyzing the image(s) to calculate a relative positioning of the moving vehicle with respect to the identified visual object(s), calculating an enhanced positioning of the moving vehicle based on the relative positioning and applying the enhanced positioning to a navigation system of the moving vehicle.

10 Claims, 7 Drawing Sheets

(51) Int. Cl.
*G01C 21/28* (2006.01)
*G01S 19/48* (2010.01)
*G06T 7/62* (2017.01)
*G06T 7/70* (2017.01)
*G06T 7/80* (2017.01)
*G06V 20/56* (2022.01)
*G06V 20/58* (2022.01)
*G06V 20/64* (2022.01)

(52) U.S. Cl.
CPC .......... *G01C 21/28* (2013.01); *G01C 21/3811* (2020.08); *G01C 21/3819* (2020.08); *G01S 19/485* (2020.05); *G06T 7/62* (2017.01); *G06T 7/70* (2017.01); *G06T 7/80* (2017.01); *G06V 20/582* (2022.01); *G06V 20/588* (2022.01); *G06V 20/64* (2022.01); *G06T 2207/10032* (2013.01); *G06T 2207/30256* (2013.01)

(58) Field of Classification Search
CPC ... G06T 7/70; G06T 7/80; G06T 2207/10032; G06T 2207/30256; G06V 20/582; G06V 20/588; G06V 20/64
See application file for complete search history.

(56) References Cited

U.S. PATENT DOCUMENTS

| | | | | |
|---|---|---|---|---|
| 9,435,653 | B2* | 9/2016 | Zeng | G01S 19/42 |
| 9,494,942 | B1* | 11/2016 | Montemerlo | B60W 30/18154 |
| 9,817,399 | B2* | 11/2017 | Braunstein | G05D 1/0251 |
| 9,857,181 | B2* | 1/2018 | Song | G01S 19/45 |
| 9,989,650 | B2* | 6/2018 | Phuyal | G01S 5/16 |
| 10,168,698 | B2* | 1/2019 | Tillmann | G05D 1/0022 |
| 10,240,934 | B2* | 3/2019 | Miksa | G06T 7/50 |
| 10,248,124 | B2* | 4/2019 | Bellaiche | G05D 1/0253 |
| 10,267,920 | B2* | 4/2019 | Ishigami | G01S 19/22 |
| 10,331,957 | B2* | 6/2019 | Kwant | G06V 10/462 |
| 10,380,890 | B2* | 8/2019 | Wang | G08G 1/13 |
| 10,474,162 | B2* | 11/2019 | Browning | B60W 30/095 |
| 10,527,433 | B2* | 1/2020 | Baughman | G06Q 10/101 |
| 10,552,689 | B2* | 2/2020 | Doria | G01S 17/89 |
| 10,558,222 | B2* | 2/2020 | Fridman | B60W 60/0016 |
| 10,591,304 | B2* | 3/2020 | Knorr | G01C 21/32 |
| 10,663,304 | B2* | 5/2020 | Wege | G01C 21/3896 |
| 10,809,053 | B2* | 10/2020 | Uchiyama | G01B 11/24 |
| 11,086,334 | B2* | 8/2021 | Fridman | G05D 1/0246 |
| 11,257,177 | B2* | 2/2022 | Tazoe | G06F 16/51 |
| 11,302,021 | B2* | 4/2022 | Oryoji | G06T 17/20 |
| 11,378,407 | B2* | 7/2022 | Jeon | G01C 21/3837 |
| 2010/0026566 | A1* | 2/2010 | Ueda | G01S 19/42 |
| | | | | 342/357.36 |
| 2010/0321490 | A1* | 12/2010 | Chen | G06T 7/62 |
| | | | | 348/118 |
| 2011/0054791 | A1* | 3/2011 | Surampudi | G01C 21/12 |
| | | | | 701/472 |
| 2012/0039511 | A1* | 2/2012 | Oi | G06T 7/70 |
| | | | | 382/103 |
| 2013/0162824 | A1* | 6/2013 | Sung | G01C 21/005 |
| | | | | 348/148 |
| 2014/0343842 | A1* | 11/2014 | Ranganathan | G01C 21/30 |
| | | | | 701/472 |
| 2018/0025632 | A1* | 1/2018 | Breed | G09B 29/106 |
| | | | | 701/93 |
| 2018/0047288 | A1* | 2/2018 | Cordell | G06V 20/58 |
| 2018/0188046 | A1 | 7/2018 | Akiva et al. | |
| 2019/0003847 | A1* | 1/2019 | Song | G01C 25/00 |
| 2019/0178650 | A1* | 6/2019 | Agarwal | G06T 7/70 |
| 2019/0339701 | A1* | 11/2019 | Pedersen | G05D 1/0044 |
| 2019/0339705 | A1* | 11/2019 | Demir | G05D 1/0274 |
| 2020/0064831 | A1* | 2/2020 | Pedersen | G08G 1/0133 |
| 2020/0269877 | A1* | 8/2020 | Mortazavi | B60W 60/0025 |

FOREIGN PATENT DOCUMENTS

| | | | |
|---|---|---|---|
| JP | 2020516853 A | * | 6/2020 |
| KR | 20150116116 A | * | 7/2016 |

OTHER PUBLICATIONS

Translation of KR-20150116116-A (Year: 2016).*
Wu et al., "Vehicle Localization Using Road Markings", 2013 IEEE Intelligent Vehicles Symposium IV, Jun. 23-26, 2013, 6 pages.

* cited by examiner

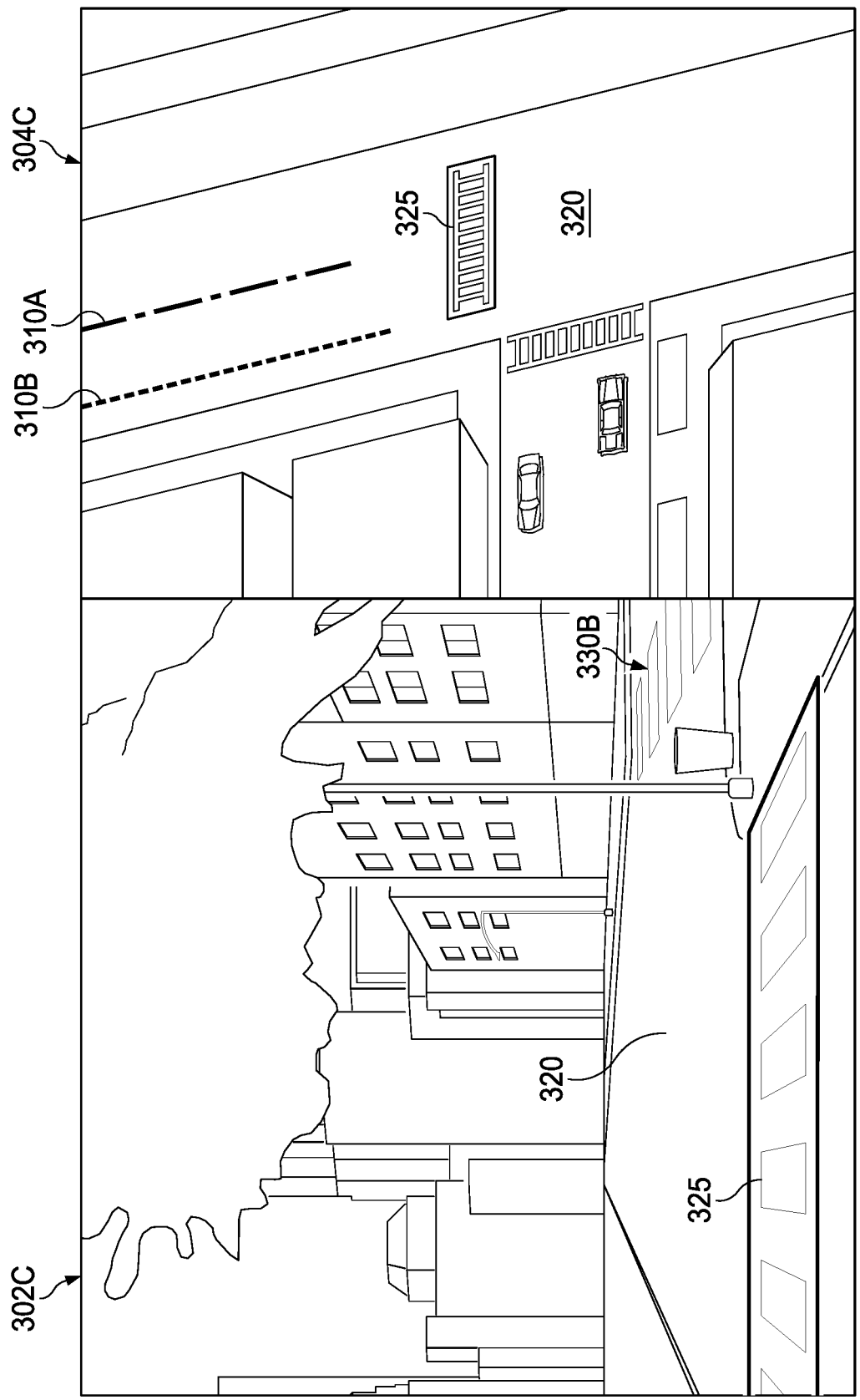

CREATION AND USE OF ENHANCED MAPS

CROSS-REFERENCE TO RELATED APPLICATIONS

This application is a divisional of U.S. patent application Ser. No. 15/860,628 filed on Jan. 2, 2018, which claims priority to European Patent Application filed on Jan. 3, 2017 and having Application No. 17150155.4. The subject matter of these related applications are hereby incorporated herein by reference.

BACKGROUND

Some embodiments described herein relate to improving positioning of a moving vehicle and, more specifically, but not exclusively, to improving positioning of a moving vehicle based on visual identification of known visual objects identified by an analysis of one or more images depicting the vehicle's surroundings.

Land navigation for the automotive and transportation markets is widely used by private people, businesses, organizations and governments worldwide. The use of navigation applications and systems either vehicle integrated and/or $3^{rd}$ party add-ons has become a basic necessity once technological obstacles involved with providing simple, low cost and reliable navigation platforms have been overcome.

The navigation systems may provide guidance, tracking and/or positioning services based on digital maps coupled with one or more positioning systems.

The most common positioning systems may typically be based on sensors receiving a signal from the Global Positioning System (GPS) and/or the Global Navigation Satellite System (GNSS). The signal may be received from several satellites of the GPS and/or the GNSS and using, for example, triangulation the current location may be calculated.

Other positioning systems may rely on dead reckoning techniques in which the position is determined by tracking distance and direction from a known point of origin. The distance and direction may be available from sensors recording time, speed, movement vectors, etc. Using the collected movement parameters, the current location/position may be calculated according to the point of origin is known. The dead reckoning applications and/or systems may correlate between the calculated position and/or track to the digital map.

SUMMARY

According to a first aspect described herein there is provided a computer implemented method of enhancing positioning of a moving vehicle based on visual identification of visual objects, comprising:
  Obtaining from a location sensor a global positioning and a movement vector of a moving vehicle.
  Capturing one or more images using one or more imaging devices mounted on the moving vehicle to depict at least partial view of the surroundings of the moving vehicle.
  Analyzing the one or more images to identify one or more visual objects having a known geographical position obtained according to the global positioning from a visual data record associated with a navigation map.
  Analyzing the one or more images to calculate a relative positioning of the moving vehicle with respect to the one or more identified visual objects.
  Calculating an enhanced positioning of the moving vehicle based on the relative positioning.
  Applying the enhanced positioning to a navigation system of the moving vehicle.

By enhancing the positing of the vehicle and applying the enhanced positioning to the navigation system, accuracy of the positioning of the vehicle may be significantly increased. The increased positioning accuracy may apply to the geographical position of the vehicle in the real world and/or the relative positioning of the vehicle with respect to the known visual object(s). This may serve to determine more accurately the positioning of the vehicle with respect, for example, a road center, a turning point, a decision point and/or the like.

According to a second aspect described herein there is provided a system for enhancing positioning of a moving vehicle based on based on visual identification of visual objects, comprising one or more processors adapted to execute a code comprising:
  Code instructions to obtain from a location sensor a global positioning and a movement vector of a moving vehicle.
  Code instructions to receive one or more images from one or more imaging devices mounted on the moving vehicle to depict at least partial view of the surroundings of the moving vehicle.
  Code instructions to analyze the one or more images to identify one or more visual objects having a known geographical positioning obtained according to the global positioning from a visual data record associated with a navigation map.
  Code instructions to analyze the one or more images to calculate a relative positioning of the moving vehicle with respect to the one or more identified visual objects.
  Code instructions to calculate an enhanced positioning of the moving vehicle based on the relative positioning.
  Code instructions to apply the enhanced positioning to a navigation system of the moving vehicle.

By enhancing the positing of the vehicle and applying the enhanced positioning to the navigation system, accuracy of the positioning of the vehicle may be significantly increased. The increased positioning accuracy may apply to the geographical position of the vehicle in the real world and/or the relative positioning of the vehicle with respect to the known visual object(s).

According to a third aspect described herein there is provided a computer implemented method of enhancing a navigation map by supplementing the map with visual data of visual objects, comprising:
  Analyzing one or more images to identify one or more of a plurality of visual objects depicted in the one or more images.
  Updating a map with a visual data record comprising one or more visual appearance attributes of the one or more identified visual object and a known geographical positioning of the one or more identified visual objects.

Enhancing the map, in particular a navigation map with the visual information of the known visual objects, in particular, road infrastructure coupled with the geographical position of each of the known visual objects may serve navigation systems and/or applications to enhance the positioning of vehicles. The known visual objects may be identified in the surroundings of the vehicles and their geographical position information retrieved to enhance the positioning of the vehicles.

With reference to the first and/or second aspects, according to a first implementation, the moving vehicle is a ground vehicle advancing on a road. The enhanced positioning may be applied to navigation systems and/or applications that are wide spread and commonly used with ground vehicles.

With reference to the first and/or second aspects or the first implementation, according to a second implementation, the location sensor is a member of a group consisting of: a global navigation system (GPS) sensor and a dead-reckoning navigation sensor. Supporting a plurality of sensors may enable flexibility in design, implementation and/or integration of the enhanced positing system.

With reference to the first and/or second aspects or any of the previous implementations, according to a third implementation, the one or more imaging devices are calibrated with respect to the moving vehicle to maintain a known relation between the one or more imaging devices and the moving vehicle with respect to a position and/or an orientation. Calibrating the imaging device(s) with respect to the vehicle may be essential to properly align the vehicle with respect to identified known visual objects. Knowledge of the location, orientation and/or position of the imaging device must be substantially accurate to serve as basis for the relative positioning calculation.

With reference to the first, second and/or third aspects or any of the previous implementations, according to a fourth implementation, the visual data record comprises visual appearance information of the one or more visual objects. The visual appearance information includes one or more visual appearance attributes that is a member of a group consisting of: an outline, a pattern, a shape and a dimension. The visual appearance attributes are used to identify the known visual objects while analyzing the captured image(s).

With reference to the first, second and/or third aspects or any of the previous implementations, according to a fifth implementation, the one or more visual objects are road infrastructure objects. The road infrastructure objects are members of a group comprising of: a pedestrian crossing marking, an intersection stop line marking, a pavement edge, a roundabout entry, a roundabout exit, a turning bay entry, a turning bay exit, a road perimeter line, a perimeter line of a road, a traffic sign, a light pole, a landmark, a point of interest and a distinguished reference point. The road infrastructure objects may be of particular use for ground vehicle navigation. Moreover, the wide range of the road infrastructure objects that are typically present at most areas covered by typical navigation systems and/or applications may assure that the visual objects may be detected in most areas travelled by ground vehicles.

With reference to the first and/or second aspects or any of the previous implementations, according to a sixth implementation, the enhanced positioning is applied to improve an accuracy of an augmented reality presentation presented to a user of the moving vehicle. Improving the accuracy of the augmented reality presentation may present major benefits to the user that may be presented with more accurate navigation instructions, decision point(s) indications, points of interest indications and/or the like.

With reference to the first and/or second aspects or any of the previous implementations, according to a seventh implementation, the analysis includes applying one or more visual classification functions on the one or more images to identify the one or more visual objects. Employing the classification functions as known in the art may serve for efficient identification of the known visual object(s) in the captured image(s).

With reference to the first and/or second aspects or any of the previous implementations, according to an eighth implementation, the analysis comprises identifying only relevant visual objects is the surroundings, wherein the relevant visual objects are within a visual line of sight from the vehicle. Ignoring irrelevant visual objects that may be blocked and/or out of view in the captured image(s) may significantly reduce the computation resources consumed by the analysis.

With reference to the first and/or second aspects or any of the previous implementations, according to a ninth implementation, calculating the relative positioning is based on determining an aspect ratio of the one or more identified visual objects as depicted in the one or more images compared to a physical size of the one or more identified visual objects. Determination of the aspect ratio is done according to one or more methods:

Analyzing dimension information extracted from the visual data record of the one or more identified visual objects.

Analyzing a difference in one or more dimensions of the one or more identified visual objects as detected in at least two consecutive images.

Accurately translating the distances in the image to real world distances is essential for accurately calculating the relative positioning and hence the enhanced positioning. Employing one or more of the methods may allow for high accuracy of the translation. Moreover, the methods may be used as appropriate for each scenario according to one or more conditions.

With reference to the third aspect or any of the previous implementations, according to a tenth implementation, the one or more images are captured from a view that is a member of a group consisting of: a ground level view, an aerial view and a satellite view. Supporting a variety of image types for analysis to identify the known visual objects may serve for efficient trade-off between relatively low cost of capturing aerial view images versus significantly higher cost ground view images. While the ground view images may present high benefit, in particular for enhancing navigation maps used by ground vehicles capturing the known visual objects at ground level, the cost for covering high areas with ground view images may be extremely high. The cost of the aerial view images may be significantly lower since they provide high area coverage, however the aerial view images may present limitations with respect to identifying the known visual objects at ground level. Moreover, while the aerial view images, in particular the satellite captured images may be used for relatively open spaces, they may be limited to properly depict crowded metropolitan areas. Supporting the variety of image types may allow combining ground level, aerial and/or satellite captured images, using one or more of the image types based on the mapped area and/or the like.

Unless otherwise defined, all technical and/or scientific terms used herein have the same meaning as commonly understood by one of ordinary skill in the art to which the embodiments described herein pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

Implementation of the method and/or system of embodiments described herein can involve performing or completing selected tasks manually, automatically, or a combination thereof. Moreover, according to actual instrumentation and equipment of embodiments of the method and/or system described herein, several selected tasks could be implemented by hardware, by software or by firmware or by a combination thereof using an operating system.

For example, hardware for performing selected tasks according to embodiments described herein could be implemented as a chip or a circuit. As software, selected tasks according to embodiments described herein could be implemented as a plurality of software instructions being executed by a computer using any suitable operating system. In an exemplary embodiment described herein, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments described herein are described by way of example only, with reference to the accompanying drawings. With specific reference now to the drawings in detail, it is stressed that the particulars shown are by way of example and for purposes of illustrative discussion of embodiments described herein. In this regard, the description taken with the drawings makes apparent to those skilled in the art how embodiments described herein may be practiced.

In the drawings.

DETAILED DESCRIPTION

Figure 1:
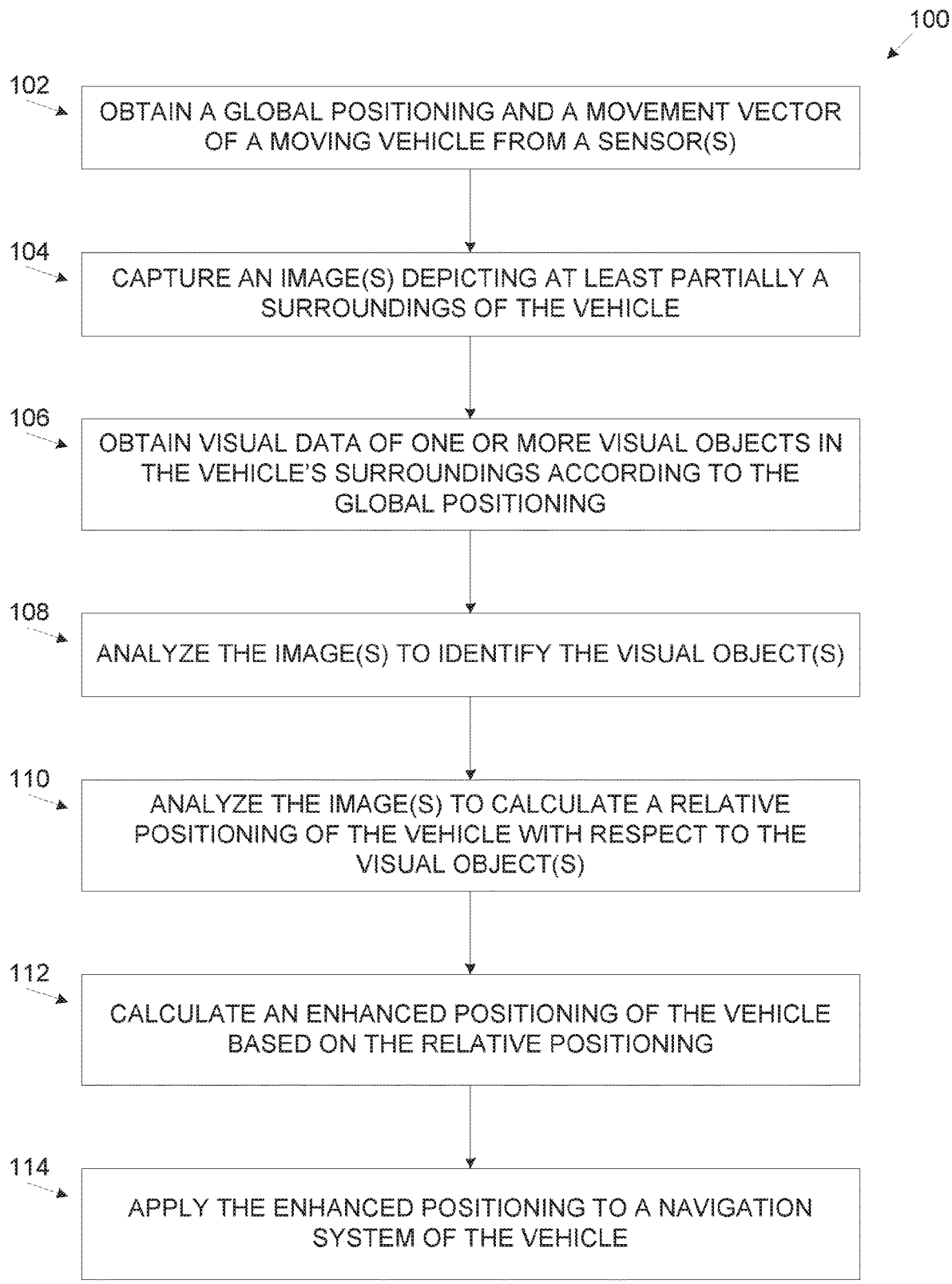
FIG. 1 is a flowchart of an exemplary process for improving positioning of a moving vehicle based on visual identification of known visual objects according to an analysis of one or more images, according to some embodiments described herein.

Some embodiments described herein relate to improving positioning of a moving vehicle and, more specifically, but not exclusively, to improving positioning of a moving vehicle based on visual identification of known visual objects identified by an analysis of one or more images depicting the vehicle's surroundings.

According to some embodiments described herein, there are provided methods, systems and devices for improving positioning of a moving vehicle using a navigation system by analyzing in real time a plurality of images depicting the surroundings of the vehicle to detect one or more known visual objects. The enhanced positioning may be calculated based on a relative positioning of the vehicle, in particular a ground vehicle with respect to the known visual object(s) each associated with a known geographical position. The improved positioning may be applied to the navigation system, for example, for improving an augmented reality presentation of guiding instructions to a user using the navigation system.

The known visual objects may include, for example, road infrastructure objects such as, for example, a perimeter line of the road, a sidewalk (pavement) edge, a traffic sign, a traffic light, a roundabout entry, a roundabout exit, a turning bay entry, a turning bay exit, a road marking (e.g. a pedestrian crossing, an intersection stop line, etc.), a perimeter line of a road and/or the like. The known road infrastructure objects may further include one or more reference points, for example, an intersection center, a roundabout center, a street center, a road center, a lane center and/or the like. The known visual objects may also include one or more points of interest, for example, a landmark, a distinguished building, a distinguished monument and/or the like which may be reliably distinguished from their surroundings. The points of interest may further include, for example, a destination house number (address), a house number of one or more navigation points along the navigation route, a building marking, a business sign and/or the like. The known visual object(s) may be preloaded into a visual data record that may be supplemental to a map of the navigation system. For each of the known visual objects, the visual data record may include at least the geographical position of the known visual object and visual appearance information of the known visual object comprising one or more visual appearance attributes of the visual object, for example, an outline, a pattern, a shape, a dimension, and/or the like.

The analysis may employ one or more computer vision methods, techniques and/or algorithms, for example, image processing, pattern recognition, visual classifiers and/or the like to identify the known visual object(s) that may be present in the vehicle's surroundings. The analysis may be adapted to detect the known visual object(s) observable from the vehicle as determined according to a global positioning and a movement vector of the vehicle received from one or more sensors, for example, a GPS sensor, a dead reckoning sensor and/or the like. The analysis may be further adapted to identify only relevant known visual object(s) that are in a line of sight from the vehicle. The analysis may make further use of the known geographical position of one or more of the detected known visual objects to detect additional one or more known visual objects.

Based on the detected known visual object(s), further analysis of the image(s) using one or more heuristics may be applied to calculate the relative positioning of the vehicle with respect to the identified known visual object(s). The vehicle's positioning accuracy may be significantly increased by calculating the enhanced positioning according to the known geographical position of the detected known visual object(s) coupled with the calculated relative positioning. The enhanced positioning may be applied to the navigation system, for example, for improving an augmented reality navigation guidance presentation such as, for example, a visual presentation and/or an audible presentation. The augmented reality presentation may be improved, for example, to increase accuracy of a decision point and/or a turning point indication by identifying one or more of the known visual objects, in particular the known known road infrastructure object(s) in proximity to the vehicle. In another example, an indicating of one or more of the augmented reality objects, for example, a destination object, a point of interest object and/or the like may be significantly increased.

According to some embodiments described herein, there are provided methods, systems and devices for enhancing a navigation map with the visual data record describing a plurality of known visual objects, for example, the road infrastructure objects, the reference points and/or the points of interest that may be used for calculating the enhanced positioning of the vehicle, in particular the ground vehicle. A plurality of images, for example, street level view images, aerial view images and/or satellite view images depicting locations of interest (i.e. supported by the navigation system) may be analyzed to identify one or more of a plurality of road infrastructure objects. The visual data record may be created and/or amended to include each of the identified visual objects, now being one of the known visual objects. For each of the known visual objects, the visual data record may include at least the geographical position of the known visual object and the visual appearance information of the known visual object.

Enhancing the positioning of the moving vehicle and applying the enhanced positioning in the navigation system may present multiple advantages over currently existing navigation systems and/or applications. First, using the navigation system with the enhanced vehicle's positioning may significantly improve accuracy of the navigation instructions presented to the user, for example, the driver of the vehicle during the navigation guidance presentation. In particular the improved accuracy may serve the user at one or more decision points in which the user may select to advance in one of a plurality of optional routes, for example, an intersection, a turning point, a road fork, a roundabout, a turning bay, a parking lot entrance/exit and/or the like. By providing more accurate navigation instructions and indications, the enhanced positioning navigation system may allow the user to better prepare for upcoming decision point. For example, in case the user plans to take a right turn (according to the navigation system planned route), the user may take preliminary measures, for example, in case the vehicle is riding in a multi-lane road, the driver may move to a right lane. Similarly, the user plans to take a left lane in case the upcoming decision point is a road fork in which the navigation system indicates taking the left road.

Moreover, in some incidents, using existing navigation systems and/or applications may lead to missing the indicated turning point due to inaccurate positioning of the vehicle, for example, in case of entering a roundabout having multiple exits that are adjacent to each other. The turning point indication presented by the existing navigation systems may be inaccurate such that the turning point indication may indicate the wrong exit and/or may be ambiguous with respect to two or more exits. By enhancing vehicles positioning and hence the navigation instructions presentation, in particular the turning point indication, the exact exit of the roundabout may be indicated to the user thus avoiding navigation errors and possibly, in some cases even traffic accidents, traffic jams and/or the like.

Furthermore, the enhanced positioning navigation system may improve an indication presented to the user according to the relative positioning of the vehicle with respect to one or more points of interest, for example, a destination location, a point of interest, a landmark and/or the like. This may allow the user to better plan his drive, parking and/or the like according to the increased accuracy positioning of the surrounding points of interest.

Before explaining at least one embodiment described herein in detail, it is to be understood that the described subject matter is not necessarily limited in its application to the details of construction and the arrangement of the components and/or methods set forth in the following description and/or illustrated in the drawings and/or the Examples. The described subject matter is capable of other embodiments or of being practiced or carried out in various ways.

The described subject matter may be a system, a method, and/or a computer program product. The computer program product may include a computer readable storage medium (or media) having computer readable program instructions thereon for causing a processor to carry out aspects of the described subject matter.

The computer readable storage medium can be a tangible device that can retain and store instructions for use by an instruction execution device. The computer readable medium may be a computer readable signal medium or a computer readable storage medium. Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described subject matter.

Aspects of the described subject matter are described herein with reference to flowchart illustrations and/or block diagrams of methods, apparatus (systems), and computer program products according to embodiments described herein. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process for improving positioning of a moving vehicle based on visual identification of known visual objects according to an analysis of one or more images, according to some embodiments described herein. A process 100 is executed to improve positioning of a moving vehicle, in particular a ground vehicle, using a navigation system by calculating an enhanced positioning of the vehicle with respect to one or more known visual objects detected in the vehicle's surroundings. One or more imaging devices, for example, a camera, a night vision camera and/or the like mounted, installed and/or mechanically coupled to the vehicle may provide a plurality of images depicting the surroundings of the vehicle.

The image(s) may be analyzed in real time to detect the known visual object(s) in the surroundings of the vehicle. The known visual objects in particular known road infrastructure objects may be obtained from a visual data record supplementing a map of the navigation system according to a global positioning of the vehicle obtained from one or more sensors, for example, a GPS sensor, a dead reckoning sensor and/or the like. Each of the known visual objects in the visual data record may be associated with visual appearance information comprising one or more visual appearance attributes of the respective visual object, for example, an outline, a pattern, a shape, a dimension, and/or the like and a known geographical position. Based on the detected known visual objects, a relative positioning of the vehicle may be calculated with respect to the known visual object(s).

The relative positioning of the vehicle may than be used to calculate an enhanced positioning of the vehicle, for example, improving the global positing of the vehicle, identifying a more accurate positioning of the vehicle with respect to the road and/or the like, The enhanced positioning may be applied to the navigation system, for example, for improving an augmented reality presentation presented by the navigation system, in particular for improving guiding instructions to a user, for example, a driver of the vehicle.

Figure 2:
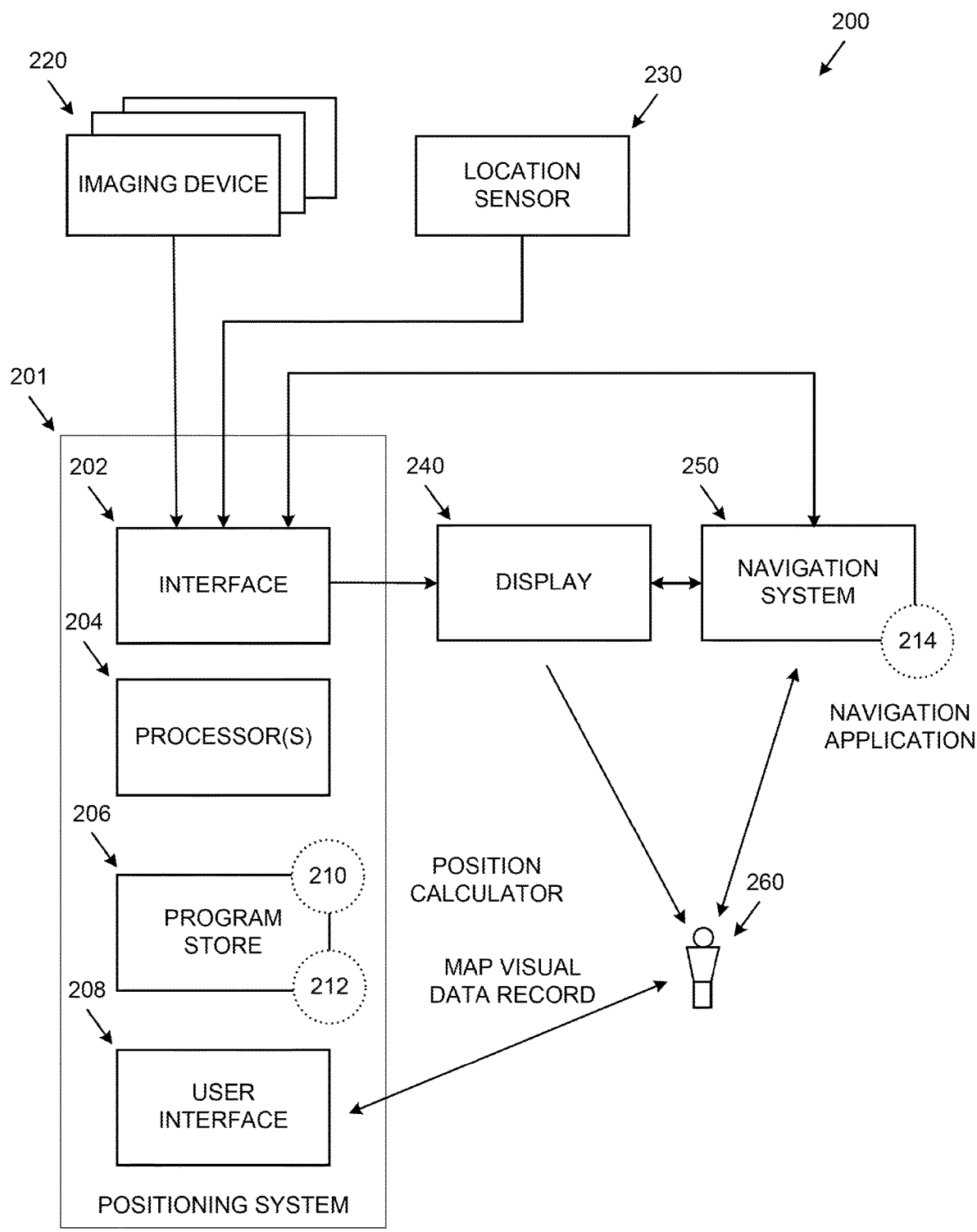
FIG. 2 is a schematic illustration of an exemplary system for improving positioning of a moving vehicle based on visual identification of known visual objects according to an analysis of one or more images, according to some embodiments described herein.

Reference is also made to FIG. 2, which is a schematic illustration of an exemplary system for improving positioning of a moving vehicle based on visual identification of known visual objects according to an analysis of one or more images. A system 200 that may be installed, integrated, mounted, coupled and/or adapted in a vehicle, in particular a ground vehicle includes a positioning system 201 that comprised an interface 202, a processor(s) 204 and a program store 206. The interface 202 may include one or more interfaces, ports and/or links, wired and/or wireless for communicating with one or more devices over one or more channels, links and/or networks, for example, a Local Area Network (LAN), a Wireless LAN (WLAN), a Universal Serial Bus (USB), a serial port, a Radio Frequency (RF) link, a Bluetooth link and/or the like. Moreover, the interface 202 may support communication with one or more remote sites, for example, a server, a processing node, a processing service, a cloud service and/or the like.

The processor(s) 204, homogenous or heterogeneous, may include one or more processing nodes arranged for parallel processing, as clusters and/or as one or more multi core processor(s). The program store 206 may include one or more non-transitory persistent memory devices, for example, a hard drive, a Flash array and/or the like. The program store 206 may further include one or more volatile memory devices, for example, a Random Access memory (RAM). The program store 204 may be used for storing one or more software modules such as, for example, a position calculator 210, wherein a software module refers to a plurality of program instructions stored in a storage medium and executed by one or more processors such as the processor(s) 204. The software modules may further include one or more data records, for example, a visual data record 212 in the form of, for example, a database, a map and/or the like.

The visual data record 212 may be a supplemental, an addition, a plug-in and/or the like for a navigation map used by a navigation system. The software module(s) may be stored in one or more of the persistent memory devices of the storage 206. Optionally, one or more of the software modules are received from one or more of the remote location and loaded into the program store 206 to be executed by the processor(s) 204. Optionally, the positioning system 201 includes a user interface 208 comprising one or more user interfaces, for example, a keyboard, a pointing device, a touch pad, a touchscreen, a display, a speaker, a microphone, an audio device and/or the like to interact with one or more users 260, for example, a driver of the vehicle.

The positioning system 201 connects, using the interface 202, to one or more imaging devices 220, for example, a camera, a stereoscopic camera, an infra-red (IR) camera, a night vision camera, a video camera and/or the like that are adapted, installed, mounted and/or arranged in the vehicle to depict at least a partial view of the vehicle surroundings. Specifically, but not exclusively, the imaging device(s) 220 are adapted to depict the vehicle surroundings in ground level (parallel to road surface), for example, in a direction of advancement of the vehicle, i.e. front and/or rear. However, the imaging device(s) 220 may be arranged to depict side view(s) of the vehicle's surroundings and/or oblique view(s), i.e. towards one or more upward and/or downward directions.

The imaging device(s) 220 may be adapted to provide a viewing angle such that at least a partial panoramic view of the vehicle surroundings is available. The imaging device(s) 220 may be calibrated such that a location, a position and/or an orientation of the imaging device(s) 220 is known with respect to the one or more axes of the vehicle, for example, a vehicle body center, a vehicle axel line and/or the like. The calibration provides a known reference and/or relation between each of the imaging device(s) 220 and the vehicle.

The positioning system 201 typically connects to one or more location sensors 230, for example, a GPS sensor, a dead-reckoning navigation sensor, an accelerometer, a gyroscope and/o the like to obtain a movement vector of the vehicle. The location sensor 230 may also include sensors connected to one or more of the vehicle's systems to collect movement information for the vehicle, for example, a steering wheel system, a wheel axel, a udometer and/or the like.

The positioning system 201 may further connect and/or communicate through the interface 202 with one or more navigation systems 250, for example, a navigation system, a navigation apparatus and/or the like. The navigation system(s) 250 may execute a navigation application 214 employing one or more navigation techniques, for example, GPS based navigation, dead-reckoning navigation and/or the like for providing navigation guidance to the user(s) 260. The navigation application 214 typically includes a navigation map of the area in which the vehicle is located. The positioning system 201 may connect, integrate and/or include a display 240 that may be used to present the user(s) 260 with the improved navigation instructions based on the enhanced positing, typically incorporated within navigational information available from the navigation system 250 also connected to the display 240. Optionally, the positioning system 201 may transmit the enhanced positioning of the vehicle to the navigation system 250 to allow the navigation system 250 to adjust accordingly the navigation guidance presentation. Naturally, the navigation system 250 includes and/or connects to the user interface 208, the display 240 and/or the location sensor(s) 230 to provide the navigation guidance presentation in one or more modality formats, for example, a visual presentation through the display 240, an audible presentation through the speaker(s) and/or the like.

In some embodiments described herein, the positioning system 201 is integrated with the navigation system 250 providing a unified platform for navigation and increased precision for the navigation guidance presentation. The integrated system may be utilized, for example, as a mobile apparatus connected to the vehicle's system(s), in particular the imaging device(s) 220 and/or as an integrated system in the vehicle. The integrated system may further include a user interface such as the user interface 208 and/or the display 240 to allow interaction with the user(s) 260.

Optionally, the visual data record 212 is integrated within the navigation map of the navigation system 250 and/or the positioning system 201 forming a high definition map used by the navigation application 214.

The positioning system 201 as well as the navigation system(s) 250 may be GPS based, dead reckoning based and/or based ion a combination of the GPS positioning techniques coupled with the dead reckoning positioning techniques.

The process 100 may be executed by the processor(s) 204 executing the position calculator 210 to calculate the enhanced positing of the vehicle by analyzing image(s) depicting the vehicle's surroundings based on a relative positioning of the vehicle compared to one or more known visual objects, in particular known road infrastructure object(s) available from the visual data record 212. The enhanced positioning may be applied to the navigation system 250, for example, to improve the navigation instructions presentation to the user 260.

As shown at 102, the process 100 starts with the position calculator 210 obtaining a global positioning and a movement vector from the location sensor(s) 230. The global positioning provides a geographical position (location) of the vehicle while the movement vector provides movement information on the movement and/or advancement of the vehicle. The accuracy of the geographical position of the vehicle provided through the global positioning may depend on the GPS system operational limitations and its accuracy may therefore be limited. The movement vector may include one or more movement parameters of the vehicle, for example, direction (yaw), a pitch, a roll, speed, acceleration, elevation (height) and/or the like.

As shown at 104, the position calculator 210 collects one or more images captured by the imaging device(s) 220. The captured image(s) depict the surroundings of the vehicle. Optionally, the position calculator 210 selects image(s) captured by relevant imaging device(s) 220 based on the movement parameter(s). For example, in case the direction parameter indicates the vehicle is moving forward, the position calculator 210 may select images captured by imaging device(s) 220 located to depict a front view of the vehicle. As another example, in case the in case the speed parameter indicates the vehicle is moving at high speed, the position calculator 210 may select images captured by imaging device(s) 220 located to depict a long range view of the vehicle.

As shown at 106, the position calculator 210 obtains from the visual data record 212 visual data of one or more of the known visual objects located in the surroundings of the vehicle and may therefore be present in the image(s). Each of the known visual objects in the visual data record may be associated with visual appearance information comprising one or more visual appearance attributes of the respective visual object, for example, an outline, a pattern, a shape, a dimension, and/or the like. Each of the known visual objects in the visual data record 212 is also associated with a known geographical position. The visual data record 212 may be an independent record used in conjunction with the navigation map used by the navigation application 214. However, in some embodiments described herein, the visual data record 212 may be integrated within the navigation map used by the navigation application 214 forming a high definition navigation map.

The visual objects may include known road infrastructure objects, for example, a perimeter line of the road, a sidewalk edge, a traffic sign, a traffic light, a roundabout entry, a roundabout exit, a turning bay entry, a turning bay exit, a road marking, a light pole, a traffic sign and/or the like. The road markings may include one or more markings that are painted on the road, for example, a pedestrian crossing (zebra crossing), an intersection stop line, a lane marking, a road perimeter marking and/or the like. The visual objects may further include one or more points of interest, for example, a landmark, a distinguished building, a distinguished monument and/or the like which may be reliably distinguished from their surroundings. The points of interest may further include, for example, a destination house number (address), a house number of one or more navigation points along the navigation route, a building marking, a business sign and/or the like.

The position calculator 210 may retrieve the visual object(s) based on the global positioning of the vehicle according to the geographical position associated with each of the visual objects in the visual data record 212. This may allow the position calculator 210 to retrieve only visual object(s) that are located in the vehicle's surroundings and may therefore be depicted in the image(s) while ignoring other visual object(s) that are not located in the vehicle's surroundings. Moreover, the position calculator 210 may retrieve visual object(s) based on the movement vector of the vehicle. Based on the movement vector, the position calculator 210 may retrieve only visual object(s) that may be detected by the imaging device(s) 220 while ignoring other visual object(s) that may not be depicted by the imaging device(s) 220.

For example, assuming the global position and/or the movement vector indicate that the vehicle is advancing north and the imaging device(s) 220 depict a forward and a westward side of the vehicle. Based on the global position and/or the movement vector of the vehicle, the position calculator 210 may retrieve visual objects that are located in front and/or to the right of the vehicle while ignoring visual objects that are located to the left of the vehicle. In another example, assuming the global position and/or the movement vector indicate that the vehicle is advancing in an elevated location. Based on the global position and/or the movement vector of the vehicle, the position calculator 210 may retrieve visual objects that are located further away from the vehicle but may be still in line of sight from the vehicle due to the high elevation of the vehicle.

As shown at 108, the position calculator 210 analyzes the captured image(s) to identify one or more of the retrieved known visual objects that may be located in the vehicle's surroundings and may therefore be depicted in the image(s). Optionally, the position calculator 210 analyzes the captured image(s) to identify only relevant visual objects while eliminating known visual object(s) that may not be in line of sight from the current position of the vehicle. The position calculator 210 may select the relevant known visual object(s) based on the obtained global position and/or the movement vector of the vehicle combined with a visual analysis of the captured image(s).

For example, the position calculator 210 may identify that the line of sight to one or more of the retrieved known visual objects is blocked, for example, by another vehicle, by a building and/or other blocking object(s). The position calculator 210 may further select the relevant known visual object(s) according to a time of day. For example, assuming the position calculator 210 identifies the current time is a night time, the position calculator 210 may avoid analyzing the captured image(s) to detect retrieved known visual object(s) that may not be properly and/or adequately distinguished in the dark. The position calculator 210 may obtain the current time from one or more clock sources, for example, the sensor 230, for example, the GPS sensor, an integrated clock in the positioning system 201, a clock of the navigation system 250 and/or the like.

The position calculator 210 may analyze the captured image(s) compared to the visual appearance information retrieved from the visual data record 212 for the relevant known visual object(s) to identify the retrieved known visual object(s). The position calculator 210 may analyze the captured image(s) using one or more computer vision analyses as known in the art, for example, pattern recognition, visual classification (classifiers) and/or the like to identify the known visual object(s). The visual classification functions may be implemented through one or more probabilistic models, for example, a neural network and/or the like. The visual classifiers may further use machine learning to train the classifiers.

The position calculator 210 may employ, for example, image processing and/or pattern recognition to detect, for example, road markings painted on the road in the direction of advancement of the vehicle in order to identify an upcoming intersection and/or a roundabout. Optionally, in case of partial view of the known visual object(s) resulting from, for example, limited view, limited visibility, blocking objects and/or the like, the position calculator 210 may extrapolate and/or interpolate the outline of the partially visible known visual object(s) identified in the image(s) to simulate the missing parts of the identified known visual object(s).

Optionally, the position calculator 210 uses the location of one or more of the identified known visual objects as a starting point for searching the captured image(s) for one or more other known visual objects that are expected to be depicted in the captured image(s). Based on the known geographical position information available for the known visual objects, the position calculator 210 may determine that one of more of the identified known visual objects are located in proximity to the other known visual objects that are not yet identified. The position calculator 210 may then estimate the image area in which the other known visual object(s) may be depicted and analyze the estimated image area to identify the other known visual object(s).

As shown at 110, the position calculator 210 analyzes the captured image(s) to calculate a relative positioning of the vehicle with respect to one or more of the identified known visual objects. The position calculator 210 bases the relative positioning calculation on the fact that the center of the image represents the vehicle position since the relative position of the imaging device(s) 220 with respect to the vehicle that is known from the calibration done for each of the imaging device(s) 220. The position calculator 210 may employ one or more heuristics to calculate the relative positioning of the vehicle.

For example, the position calculator 210 may calculate the vehicle position based on a relational calculation of the vehicle position with respect to each of the identified known visual object(s). The position calculator 210 may extract dimension information for each of the identified known visual objects from the visual appearance information in the visual data record 212. The position calculator 210 may further use one or more characteristics of the imaging device(s) 220, for example, a focal point, a resolution and/or an image depth. The position calculator 210 may use the imaging device(s) 220 characteristic(s) combined with the dimension information of the identified known visual object(s) to determine an aspect ratio of the identified known visual object as depicted in the captured image(s) compared to the physical size of the identified known visual object(s).

Using the aspect ratio, the position calculator 210 may translate the value of a pixel in the captured image(s) to an actual distance value measured in distance units, for example, meters, yards and/or the like. After determining the value of the pixel in the captured image, the position calculator 210 may use standard algebraic operations, to calculate the pixel distance of each identified known visual object from the center of the image. The position calculator 210 may then translate the pixel distance to the actual distance units to calculate the relative positioning.

In another example, the position calculator 210 may calculate the vehicle position based the on an absolute pixel coordinates of the identified known visual object. Using standard algebraic operations, the position calculator 210 may calculate the distance between the coordinates of the identified known visual object and the center of the image and translate them to the actual distance units using the visual appearance information of the identified known visual object. Using this method the position calculator 210 may need to calculate the relative positioning with respect to only one of the identified known visual objects.

Optionally, the position calculator 210 may calculate the relative positioning based on triangulation and/or homography transformations performed over the same known visual object identified in two or more consecutive images captured by imaging device(s) 220. The position calculator 210 analyzes the consecutive images to identify the (same) traffic sign 402. The position calculator 210 may perform a transformation over one or more visual appearance attributes of the identified known visual object, for example, an outline. Based on the difference in pixels between the outline if the identified known visual object as captured in the consecutive images coupled with the outline information available from the visual data record 212 for the identified known visual object, the position calculator 210 may calculate the movement distance of the vehicle, i.e. the position change in the actual distance units with respect to the identified known visual object during the time elapsed between capturing each of the consecutive images.

The movement during the time elapsed may be calculated based on movement information of the vehicle coupled with the time elapsed between capturing the consecutive images. The position calculator 210 may extract the vehicle movement parameters such as the speed, the acceleration, the direction, the elevation, the movement angle, etc. from the obtained movement vector. Based on the real outline dimension of the identified known visual object and the movement distance of the vehicle, the position calculator 210 may deduce the relative position of the vehicle compared to the identified known visual object.

The various methods for calculating the relative positioning may be used separately and/or in combination. Moreover, The position calculator 210 may apply one or more of the relative positioning calculation according to one or more conditions, for example, a type of the known visual object, an angle of the line of sight to the known visual object, the movement vector compared to the known visual object, a light level (light to dark) and/or the like. Some of the methods may better serve one or more scenarios while other methods may better serve other scenarios.

As shown at 112, the position calculator 210 calculated the enhanced positioning of the vehicle based on the calculated relative positioning of the vehicle and according to the known geographical position of the identified known visual object. Since the geographical position of the identified known visual object(s) is available from the visual data record 212, the position calculator 210 may calculate the enhanced positioning that may be the geographical position of the vehicle in the real world by calculating the distance of the vehicle from the identified known visual object(s). The position calculator 210 may also calculate the enhanced positioning to indicate a relative position of the vehicle with respect to the road, for example, in which lane the vehicle is located, the distance of the vehicle is from the road edge, the distance of the vehicle is from the road perimeter and/or the like.

As shown at 114, the position calculator 210 may apply the enhanced positioning of the vehicle to the navigation application 214 and/or the navigation system 250. For example, the enhanced positioning may be applied to adjust an augmented reality presentation of the navigation system 250. For example, the augmented reality presentation may be adjusted to improve a navigation instruction indication of a decision point in the navigation route, for example, a turning point indication, a road selection at a road fork, an exit of a roundabout and/or the like. In another example, the augmented reality presentation may be adapted to more accurately indicate one or more of the augmented reality objects, for example, a destination object, a point of interest object and/or the like. Adjusting the augmented reality presentation to more accurately present the navigation instruction indication may serve to improve significantly the quality of the navigation guidance service provided to the user(s) 260.

This allows the user 260 to get better prepared for the upcoming decision point by taking preliminary measures, for example, moving to a right lane in case of an upcoming right turn, moving to a left lane in case of an upcoming left turn and/or the like. Moreover, in some incidents, adapting the augmented reality presentation with the enhanced positioning may prevent the user 260 from missing the indicated movement path, route and/or destination.

Figure 3A:
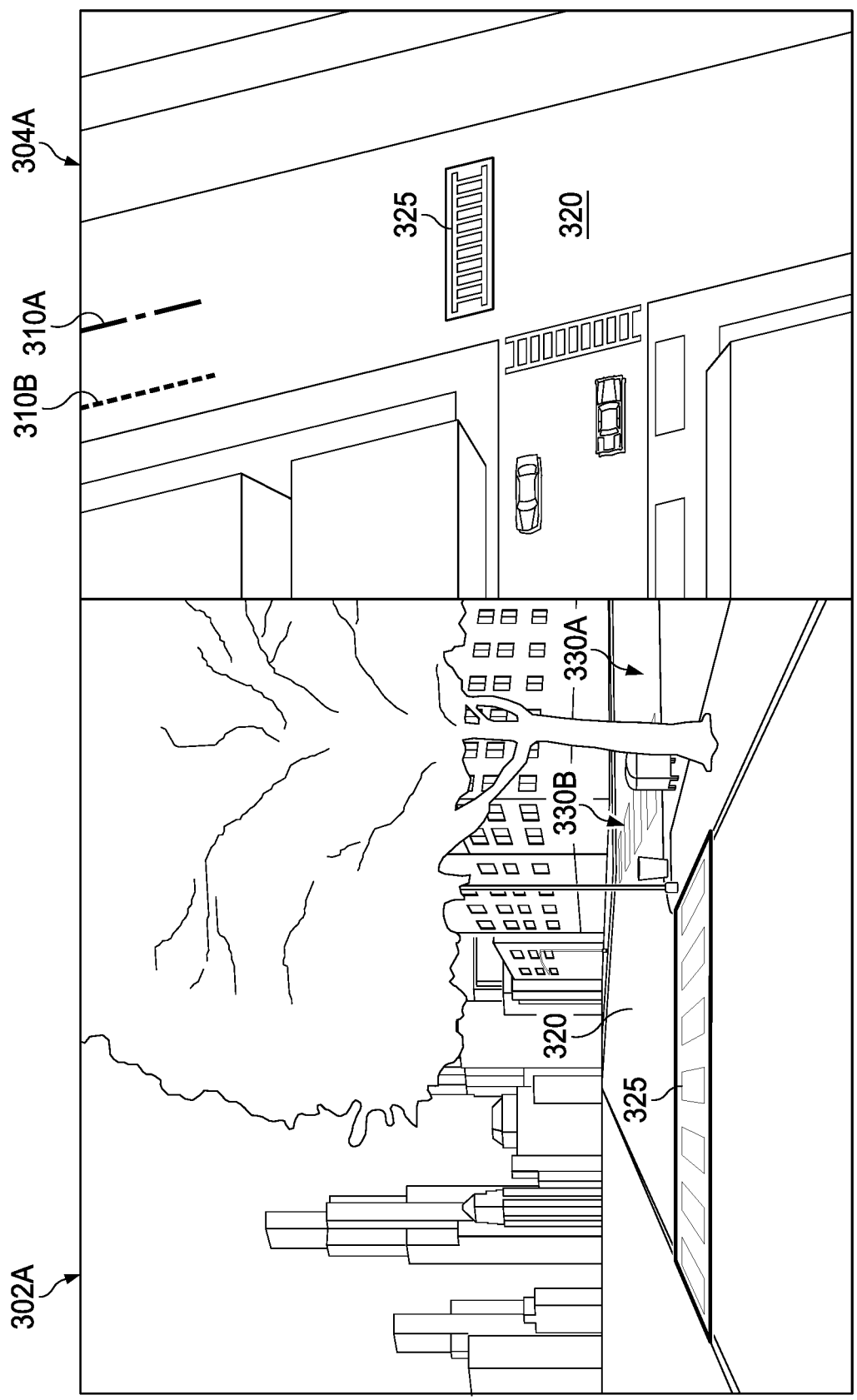
FIG. 3A, FIG, 3B and FIG. 3C are schematic illustrations of an exemplary navigation sequence employing improved navigation instructions presentation according to enhanced positing of a vehicle, according to some embodiments described herein.
Figure 3B:
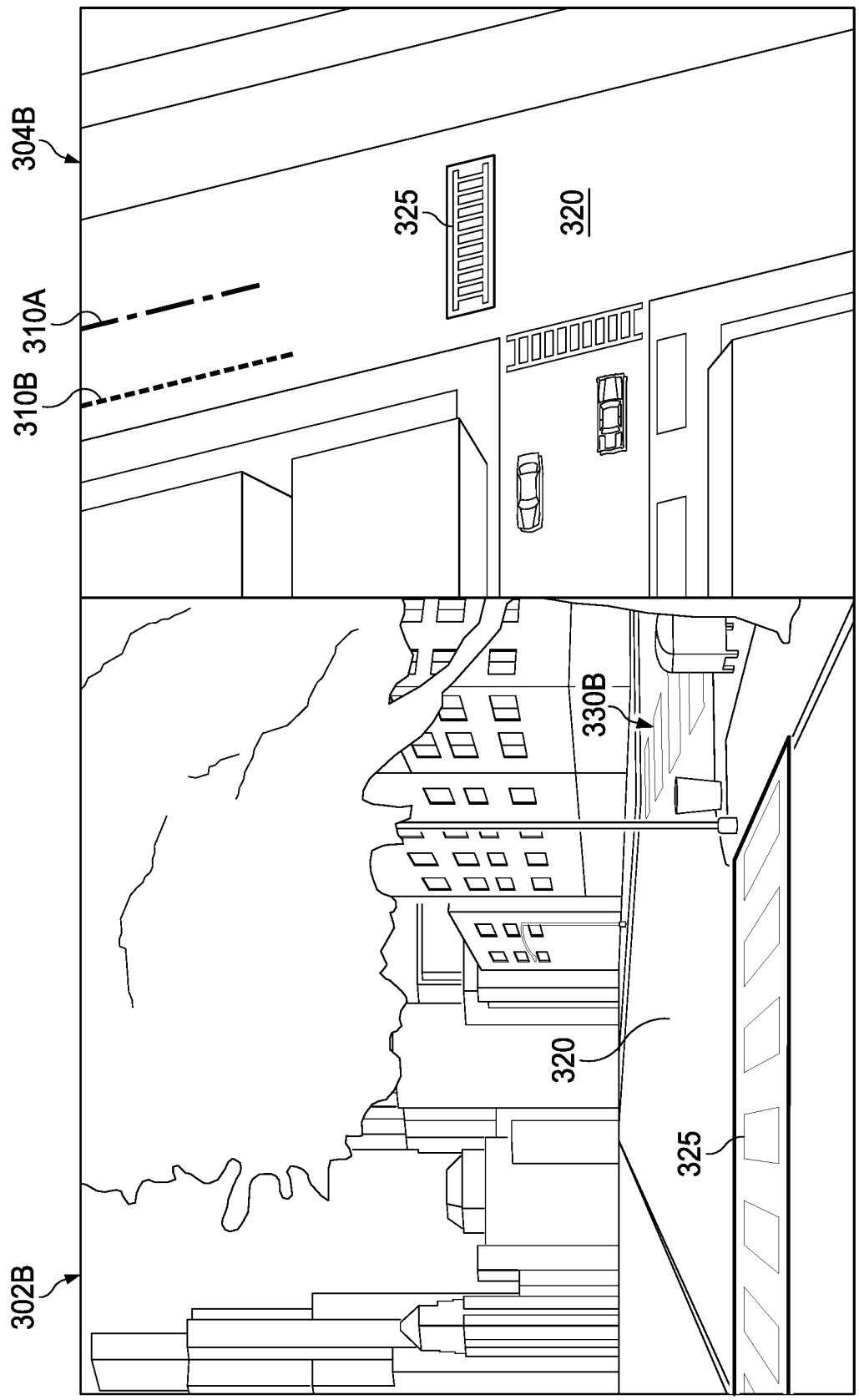

Reference is now made to FIG. 3A, FIG. 3B and FIG. 3C, which are schematic illustrations of an exemplary navigation sequence employing improved navigation instructions presentation according to enhanced positing of a vehicle, according to some embodiments described herein.

As shown in FIG. 3A, 3B and 3C, image captures 302A, 302B and 302C respectively are captured by an imaging device such as the imaging device 220 positioned in a vehicle at street level. A user such as the user 260 driving the vehicle uses a navigation system such as the navigation system 250 supported and/or integrated with a positioning system such as the positioning system 201. Image captures 304A, 304B and 304C show the same scene from an aerial view above the vehicle. The image captures 302A, 302B, 302C, 304A, 304B and 304C present a comparison between a legacy navigation systems using map data coupled with global positioning information and the navigation system 250 supported by the positioning system 201.

A navigation route presentation 310A as shown in the image captures 304A, 304B and 304C is a navigation route as presented by the legacy navigation systems. A navigation route presentation 310B as shown in the image capture 304A, 304B and 304C is a navigation route as presented by the navigation system 250 supported by the positioning system 201 running a position calculator such as the position calculator 210 to execute a process such as the process 100. As evident from the image capture 304A, while the navigation route presentation 310A is drawn at the center of the street, the navigation route presentation 310B is significantly more accurate as it is drawn at the center of the lane in the direction of advancement of the vehicle.

The improved accuracy may be provided by the position calculator 210 executing the process 100 to detect one or more known visual objects, in particular known road infrastructure objects, for example, a pavement edge of the street in which the vehicle is advancing and calculate the enhanced positioning of the vehicle. Based on the enhanced positioning, the position calculator 210 may adjust the augmented reality navigation presentation to present more accurately the navigation route presentation 310B.

As shown in the image captures 302A and 304A, the vehicle is advancing towards an intersection 320 in which the user 260 may be instructed to take a right turn. A pedestrian crossing 325 is painted on the road before the entrance to the intersection 320 in the direction of advancement of the vehicle. The legacy navigation system that may be using the map data coupled with global positioning information may present a turning point indication 330A shown in the image capture 302A. The navigation system 250 supported by the positioning system 201 may present a turning point indication 330B that may be adjusted by the position calculator 210 as shown in the image capture 302A. As evident the accuracy of the turning point indication 330B is higher compared to the turning point indication 330A with respect to the surroundings of the vehicle, i.e. the intersection 320. The increased accuracy may be achieved by the position calculator 210 executing the process 100 to detect, for example, one or more road (street) perimeter lines to identify the intersection 320.

As shown in the image capture 302B, while advancing towards the intersection 320, the position calculator 210, may retrieve, from a visual data record such as the visual data record 212 stored in a storage such as the program store 306, visual information for one or more known visual objects that are located in the vehicle surroundings, for example, the pedestrian crossing 325. As shown in the image capture 302B, as the vehicle is approaching the intersection 320, the legacy navigation system may suffer degradation in presenting the turning point indication 330A that may be out of view of the presentation displayed to the user 260.

As shown in the image capture 302C, once the position calculator 210 detects the pedestrian crossing 325 by analyzing one or more images captured by one or more imaging devices such as the imaging device 220, the position calculator 210 may calculate the distance of the vehicle to the pedestrian crossing 325. Based on the calculated distance to the pedestrian crossing 325, the position calculator 210 may further adjust the turning point indication 330B to more accurately indicate to the user 260 the exact location where the right turn may be taken.

According to some embodiments described herein there are provided methods and systems for creating a visual data record such as the visual data record 212 for enhancing a navigation map.

Figure 4:
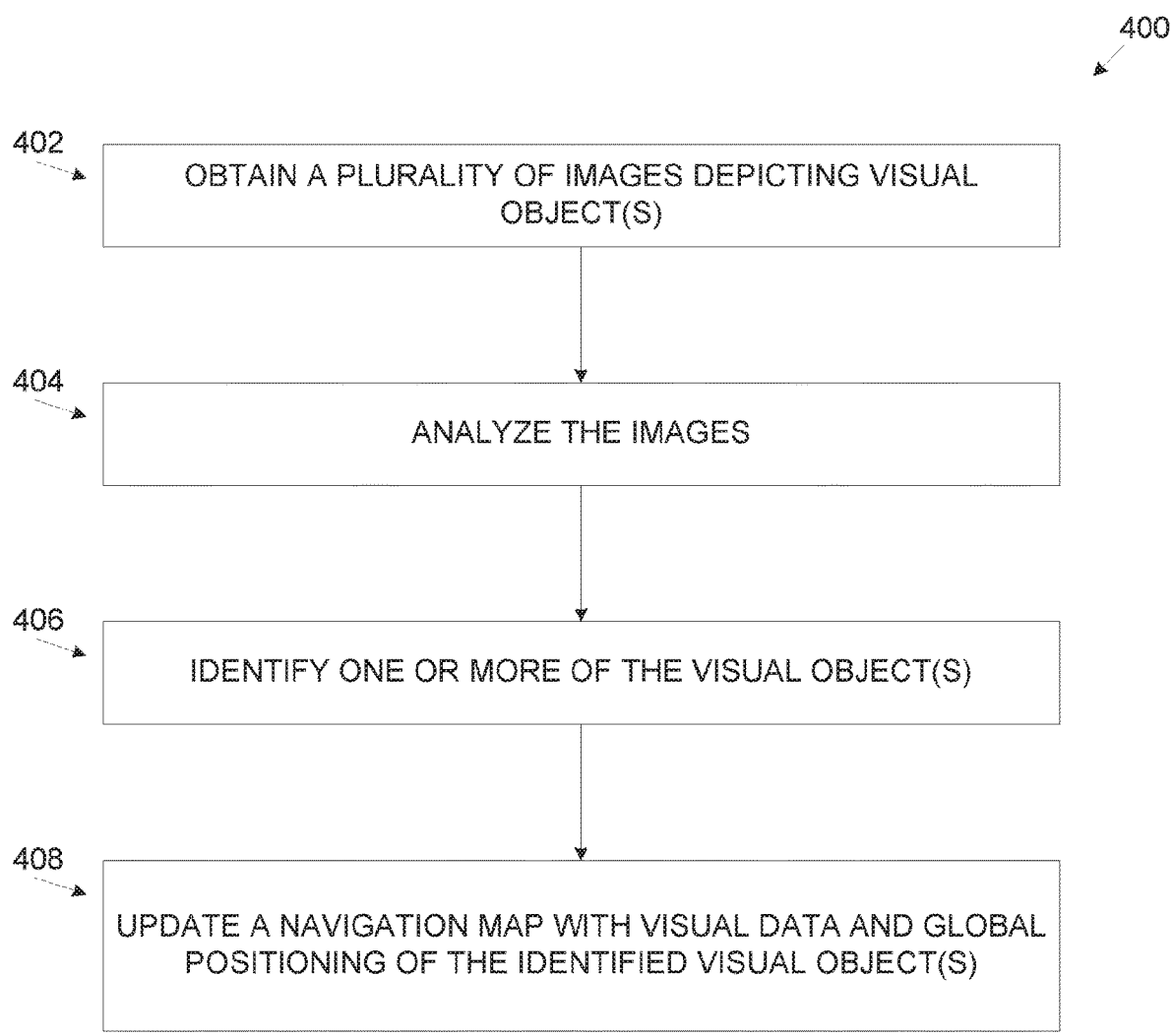
FIG. 4 is a flowchart of an exemplary process for enhancing a map with visual information of known visual object(s), according to some embodiments described herein.

Reference is now made to FIG. 4, which is a flowchart of an exemplary process for enhancing a map with visual information of known visual object(s), according to some embodiments described herein. A process 400 may be executed to create a visual data record such as the visual data record 212 storing information of a plurality of known visual objects, in particular, a known geographical position and visual information of each of the known visual objects, in particular road infrastructure objects. The map visual data record 212 may be used to enhance a navigation map used by one or more navigation applications such as the navigation application 214 and/or navigation systems such as the navigation system 250.

Figure 5:
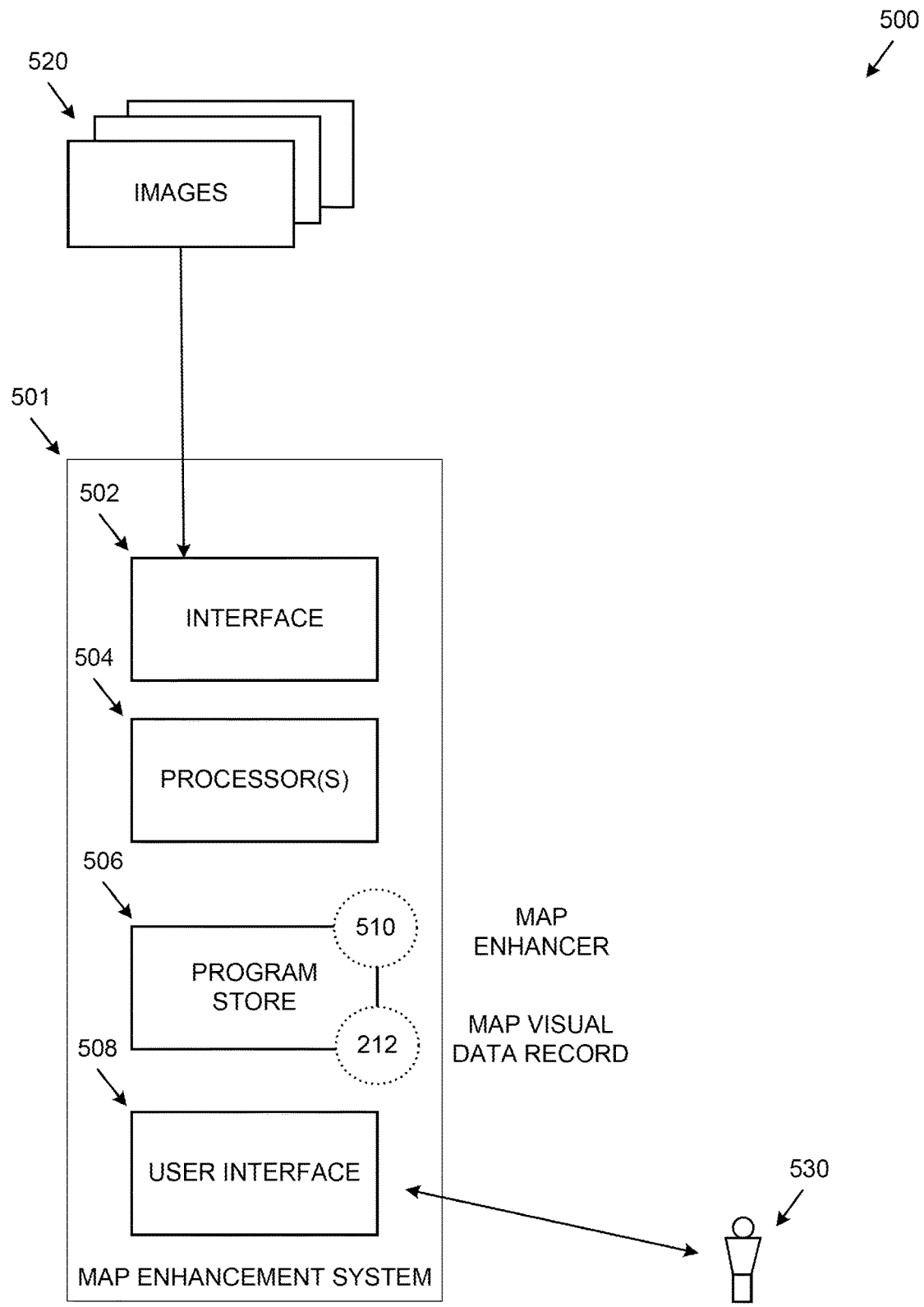
FIG. 5 is a schematic illustration of an exemplary system for enhancing a map with visual information of known visual object(s), according to some embodiments described herein.

Reference is also made to FIG. 5, which is a schematic illustration of an exemplary system for enhancing a map with visual information of known visual object(s), according to some embodiments described herein. A map enhancement system 500 may be used to execute a process such as the process 400 to enhance a map with visual information of a plurality of known visual objects, in particular road infrastructure objects. The system 500 includes a map enhancement system 501 comprising an interface 502 such as the interface 202, a processor(s) 504 such as the processor(s) 204 and a program store 506 such as the program store 206. Optionally, the map enhancement system 501 includes a user interface 508 such as the user interface 208 for interacting with a programmer 530. Optionally, the system 500 is implemented as a remote service, a cloud service and/or the like.

The map enhancement system 501 may connect to one or more processing nodes, for example, a server, a cloud service, a storage server and/or the like to collect a plurality of images 520 depicting a plurality of locations supported by one or more navigation systems such as the navigation systems 250 executing one or more navigation applications such as the navigation application 214. The images 520 may include street level images depicting the known visual objects from road level view as is seen by a vehicle.

The images 520 may also include aerial images depicting an aerial view of the known visual objects. The aerial images may be taken, for example, by an aircraft (e.g. a drone, a plane, an helicopter, etc.) and/or by a satellite. The processor(s) 504 may execute one or more software modules, for example, a map enhancer 510 to create the visual data record 212 in form of, for example, a database, a map and/or the like. Additionally and/or alternatively, the map enhancer 510 enhances one or more navigation maps with the visual information of the known visual objects to create one or more high definition navigation maps used by the navigation application(s) 214. One or more users 530 may interact with the map enhancement system 501 to adjust one or more parameters of the map enhancer 510, for example, select a location of interest, define information items to be associated with each of the known visual objects and/or the like.

As shown at 402, the process 400 starts with the map enhancer 510 obtaining the plurality of images 520. The map enhancer 510 may obtain the images 520 from one or more one or more of the processing nodes, for example, a server, a cloud service, a storage server and/or the like. The images 520 may also be uploaded to the map enhancement system 501 using one or more attachable media devices, for example, a USB drive, a hard drive, an optic storage media device and/or the like.

As shown at 404, the map enhancer 510 analyzes the images 520 to identify one or more visual objects, in particular road infrastructure objects. The map enhancer 510 may analyze the captured image(s) using one or more computer vision analyses as known in the art, for example, pattern recognition, visual classification (classifiers) and/or the like to identify the visual object(s) in the images 520. The visual classification functions may be implemented through one or more probabilistic models, for example, a neural network and/or the like. The visual classifiers may further use machine learning to train the classifiers.

As shown at 406, based on the image analysis, the map enhancer 510 identifies on or more of the visual objects, in particular road infrastructure objects, for example, a perimeter line of the road, a sidewalk (pavement) edge, a traffic sign, a traffic light, a roundabout entry, a roundabout exit, a turning bay entry, a turning bay exit, a road marking (e.g. a pedestrian crossing, an intersection stop line, etc.), a light pole, a landmark, a traffic sign and/or the like. The road markings may include one or more markings that are painted on the road, for example, a pedestrian crossing (zebra crossing), an intersection stop line, a lane marking, a road perimeter marking and/or the like. The road infrastructure object(s) may further include distinguishable reference points that may be easily and/or reliably distinguished and identified, for example, an intersection center, a roundabout center, a street center, a road center, a lane center and/or the like. The known visual objects may also include one or more landmarks, for example, a distinguished building, a distinguished monument and/or the like which may be reliably distinguished from their surroundings.

As shown at 408, once identified, the visual objects become known visual objects. The map enhancer 510 may create and/or update the visual data record 212 with information relating to each of the known visual objects, in particular, a known geographical position (location) and visual information of the known visual object. The geographical position of each of the known visual object may be available from, for example, a metadata record attached to one or more of the images 520. In some scenarios, the metadata record may indicate a geographical position of a reference point in the image 520, for example, an image center, an image corner and/or the like. Based on the geographical position of the reference point of a respective image 520 coupled with the image analysis of the respective image 520 to identify the relative position of each known visual object identified in the respective image 520, the map enhancer 510 may calculate the geographical position of each identified known visual object. The visual information collected for each of the known visual objects may include one or more visual appearance attributes, for example, an outline, a pattern, a shape, a dimension and/or the like that may be later used by a position calculator such as the position calculator 210.

The visual data record 212 may be integrated in a high definition navigation map used by one or more of the navigation applications 214. The map visual data record 212 may also be created as a separate and/or supplemental record that may be used in conjunction with a standard navigation map used by the one navigation application(s) 214.

The descriptions of the various embodiments described herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms client terminal and/or navigation system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment described herein may include a plurality of "optional" features unless such features conflict.

It is appreciated that certain features of the embodiments described herein, which are, for clarity, described in the context of separate embodiments, may also be provided in combination in a single embodiment. Conversely, various features of the embodiments described herein, which are, for brevity, described in the context of a single embodiment, may also be provided separately or in any suitable subcombination or as suitable in any other described embodiment embodiments described herein. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the described subject matter. To the extent that section headings are used, they should not be construed as necessarily limiting.

What is claimed is:

1. A computer implemented method of enhancing a navigation map by supplementing the map with visual data of a plurality of objects, comprising:
   analyzing at least one image to identify a first object included in the plurality of objects depicted in the at least one image;
   determining a geographical position of the first object based on a geographical position of a reference point of the at least one image and a position of the first object in the at least one image relative to the reference point, wherein the reference point is a center of the at least one image or a corner of the at least one image;
   updating a map with a visual data record comprising at least one visual attribute of the first object and the geographical position of the first object; and
   storing the updated map with the visual data record in a database.

2. The computer implemented method according to claim 1, wherein the at least one image is captured from a view that is a member of a group consisting of: a ground level view, an aerial view, and a satellite view.

3. The computer implemented method according to claim 1, wherein the first object is a road infrastructure object, the road infrastructure object is a member of a group comprising of: a pedestrian crossing marking, an intersection stop line marking, a pavement edge, a roundabout entry, a roundabout exit, a turning bay entry, a turning bay exit, a road perimeter line, a perimeter line of a road, a traffic sign, a light pole, a landmark, a point of interest, and a distinguished reference point.

4. The computer implemented method according to claim 1, wherein the first object is at least one road marking painted on the road.

5. The computer implemented method according to claim 1, wherein the at least one image comprises two or more images,
wherein the two or more images are captured from at least two different views that are members of a group consisting of: a ground level view, an aerial view, and a satellite view, and
wherein the analyzing further comprises combining the two or more images.

6. A system of enhancing a navigation map by supplementing the map with visual data of a plurality of objects, comprising:
at least one processor adapted to execute a code comprising:
code instructions for analyzing at least one image to identify a first object included in the plurality of objects depicted in the at least one image;
code instructions for determining a geographical position of the first object based on a geographical position of a reference point of the at least one image and a position of the first object in the at least one image relative to the reference point, wherein the reference point is a center of the at least one image or a corner of the at least one image;
code instructions for updating a map with a visual data record comprising at least one visual attribute of the first object and a known the geographical position of the first object; and
code instructions for storing the updated map with the visual data record in a database.

7. The system according to claim 6, wherein the at least one image is captured from a view that is a member of a group consisting of: a ground level view, an aerial view, and a satellite view.

8. The system according to claim 6, wherein the first object is a road infrastructure object, the road infrastructure object is a member of a group comprising of: a pedestrian crossing marking, an intersection stop line marking, a pavement edge, a roundabout entry, a roundabout exit, a turning bay entry, a turning bay exit, a road perimeter line, a perimeter line of a road, a traffic sign, a light pole, a landmark, a point of interest, and a distinguished reference point.

9. The system according to claim 6, wherein the first object is at least one road marking painted on the road.

10. The system according to claim 6, wherein the at least one image comprises two or more images,
wherein the two or more images are captured from at least two different views that are members of a group consisting of: a ground level view, an aerial view, and a satellite view, and
wherein the code instructions for analyzing further comprises code instructions for combining the two or more images.

* * * * *

UNITED STATES PATENT AND TRADEMARK OFFICE
CERTIFICATE OF CORRECTION

| | | |
|---|---|---|
| PATENT NO. | : 11,959,771 B2 | Page 1 of 1 |
| APPLICATION NO. | : 17/219810 | |
| DATED | : April 16, 2024 | |
| INVENTOR(S) | : Ohad Akiva and Dan Atsmon | |

It is certified that error appears in the above-identified patent and that said Letters Patent is hereby corrected as shown below:

In the Claims

Column 21, Claim 6, Line 27, please delete "a known".

Signed and Sealed this
Fourth Day of June, 2024

Katherine Kelly Vidal
*Director of the United States Patent and Trademark Office*